United States Patent
Erkkilä et al.

(10) Patent No.: US 10,701,873 B2
(45) Date of Patent: Jul. 7, 2020

(54) **GROWING MEDIUM STRUCTURES BASED ON *SPHAGNUM* MOSS AND METHOD FOR THE MANUFACTURE THEREOF**

(71) Applicants: TEKNOLOGIAN TUTKIMUSKESKUS VTT OY, Espoo (FI); LUONNONVARAKESKUS, Helsinki (FI)

(72) Inventors: Ari Erkkilä, Jyväskylä (FI); Kirsi Immonen, Jyväskylä (FI); Karita Kinnunen, Jyväskylä (FI); Antti Oksanen, Jyväskylä (FI); Risto Tahvonen, Jokioinen (FI); Liisa Särkkä, Jokioinen (FI); Juha Näkkilä, Jokioinen (FI); Tuomo Hjelt, Vtt (FI); Kari Jokinen, Jokioinen (FI)

(73) Assignees: TEKNOLOGIAN TUTKIMUSKESKUS VTT OY, Espoo (FI); LUONNONVARAKESKUS, Helsinki (FI)

( * ) Notice: Subject to any disclaimer, the term of this patent is extended or adjusted under 35 U.S.C. 154(b) by 551 days.

(21) Appl. No.: 15/025,120

(22) PCT Filed: Sep. 25, 2014

(86) PCT No.: PCT/FI2014/050732
§ 371 (c)(1),
(2) Date: Mar. 25, 2016

(87) PCT Pub. No.: WO2015/044526
PCT Pub. Date: Apr. 2, 2015

(65) Prior Publication Data
US 2016/0219810 A1  Aug. 4, 2016

(30) Foreign Application Priority Data
Sep. 26, 2013 (FI) .................................... 20135965

(51) Int. Cl.
*A01G 23/00* (2006.01)
*D21F 11/00* (2006.01)
(Continued)

(52) U.S. Cl.
CPC ............. *A01G 23/00* (2013.01); *A01G 24/00* (2018.02); *D21F 11/002* (2013.01); *A01G 24/18* (2018.02)

(58) Field of Classification Search
USPC ........... 47/59 S, 9, DIG. 10, 58.1 SC; 71/24; 44/490
See application file for complete search history.

(56) References Cited

U.S. PATENT DOCUMENTS 4,023,308 A * 5/1977 Staby ........................ A01G 9/00 47/79
4,056,456 A * 11/1977 Sano .......................... C08J 3/28 204/157.64
(Continued)

FOREIGN PATENT DOCUMENTS

CA 2264199 * 11/1998 ............. A61F 13/46
CA 2 264 199 A1 5/2000
(Continued)

OTHER PUBLICATIONS

Sphagnum as a Mulch, by Mosser Lee, 1 page, retrieved from the interent on Jun. 18, 2019 [https://web.archive.org/web/20111121133651/https://www.mosserlee.com/Page/Sphagnum_As_a_Mulch.aspx?nt=313] Nov. 21, 2011.*
(Continued)

*Primary Examiner* — Andrea M Valenti
(74) *Attorney, Agent, or Firm* — Birch, Stewart, Kolasch & Birch, LLP

(57) ABSTRACT

The invention relates to growing medium structures comprising *Sphagnum* moss, to a foam-laid method for their manufacture and to the use thereof in horticulture, landscaping and forestry applications.

12 Claims, 1 Drawing Sheet

(51) Int. Cl.
*A01G 24/00* (2018.01)
*A01G 24/18* (2018.01)

(56) References Cited

U.S. PATENT DOCUMENTS

| | | | | |
|---|---|---|---|---|
| 4,196,543 | A * | 4/1980 | Dedolph | A01G 24/60 47/5.5 |
| 4,215,692 | A * | 8/1980 | Levesque | A61F 13/15203 162/92 |
| 4,443,297 | A * | 4/1984 | Cheshire | D21F 11/002 162/101 |
| 4,676,784 | A * | 6/1987 | Erdman | A61F 13/532 604/368 |
| 4,782,626 | A * | 11/1988 | Shanley | A01G 13/0268 47/9 |
| 5,018,300 | A * | 5/1991 | Chiu | A01G 9/02 47/67 |
| 5,163,247 | A * | 11/1992 | Weber | A01G 13/0268 47/9 |
| 5,531,726 | A * | 7/1996 | Levesque | A61F 13/15203 604/358 |
| 5,635,029 | A | 6/1997 | Levesque et al. | |
| 6,029,395 | A | 2/2000 | Morgan | |
| 6,592,713 | B2 * | 7/2003 | Ahoniemi | D04H 3/02 162/103 |
| 7,174,671 | B2 * | 2/2007 | Moore | A01C 1/044 47/56 |
| 7,422,660 | B2 * | 9/2008 | Billgren | D04H 1/425 156/62.2 |
| 2006/0151902 | A1 * | 7/2006 | Just | B27N 5/02 264/37.29 |

FOREIGN PATENT DOCUMENTS

| | | | | |
|---|---|---|---|---|
| CA | 2264199 | * | 5/2000 | |
| EP | 0220422 | * | 8/1986 | A61F 13/18 |
| EP | 0 220 422 A2 | | 5/1987 | |
| EP | 0481746 A1 | * | 10/1991 | D21F 11/00 |
| EP | 0 481 746 A1 | | 4/1992 | |
| EP | 1 116 434 A1 | | 7/2001 | |
| EP | 1116434 | * | 7/2001 | A01G 13/02 |
| EP | 2 586 292 A1 | | 5/2013 | |
| GB | 519724 | | 4/1940 | |
| WO | WO 9602702 A1 | | 2/1996 | |
| WO | WO 98/56232 A1 | | 12/1998 | |

OTHER PUBLICATIONS

International Search Report dated Dec. 23, 2014, in PCT International Application No. PCT/FI2014/050732.
Search Report issued in Finnish priority Application No. 20135965, dated Apr. 22, 2014.
Written Opinion of the International Searching Authority dated Dec. 23, 2014, in PCT International Application No. PCT/FI2014/050732.
Extended European Search Report dated Jun. 7, 2017, in European Patent Application No. 14847890.2.

* cited by examiner

GROWING MEDIUM STRUCTURES BASED ON *SPHAGNUM* MOSS AND METHOD FOR THE MANUFACTURE THEREOF

FIELD OF THE INVENTION

The invention relates to growing medium structures based on *Sphagnum* moss. The invention further relates to a method for the manufacture of said growing medium structures, where the method utilizes foam-laid technique. The invention also relates to the use of said growing medium structures based on *Sphagnum* moss in applications such as horticulture, landscaping and forestry applications, particularly as growing media.

BACKGROUND

"White peat" or peat moss, coconut fibers and rock wool are widely used in horticulture and in greenhouse cultivation as substrate materials. Additionally some synthetic cultivation media have been developed, however, their use is limited.

Rock wool is manufactured from stone by heating with the technology used in the manufacture of insulation boards for construction industry. Rock wool growing medium requires constant fertilization with irrigation water. Water is not retained evenly throughout the rock wool medium. Rock wool is not recyclable by composting and it cannot be used as landfill waste.

Coconut fibers obtained from coconuts are used in the manufacture of cultivation boards, typically containing finer fibers on the top and rougher fibers at the bottom of the board to provide an even water distribution in the board. The availability of coconut fibers is limited and further, cultivation of plants sensitive to saline water may be problematic as salts are released from coconut fibers during irrigation.

Peat is widely used as growing medium in horticulture and about 30 million $m^3$ of white peat is globally used for this purpose. White peat, also known as *Sphagnum* peat is fossil material and a decomposition product originating from *Sphagnum* moss. Peat accumulates in peat lands and bogs. In most countries in the Western and Central Europe the stocks of fossil white peat are almost depleted and peat industry has increasingly removed to the Baltic States, Scandinavia and Canada.

Peat is considered as finite and non-renewable resource, or very slowly renewable resource. It is renewed in the topmost layers of peat bogs very slowly, depending on the thickness of the layer, surrounding conditions and growth. Peat industry is generally regarded as irreversibly destroying the important nature conservation functions, particularly biodiversity and climate regulation functions, especially carbon storage. Peat is considered a carbon reservoir, but after a short period of use as a growth substrate in the greenhouse production it becomes a major carbon emitter.

Peat has ideal properties as a cultivation medium with respect to fertilization and irrigation. Used peat products may be recycled as compost and landfill waste material, and if desired, they may be burned. There is a shortage of high-quality peat in Europe. Further, peat has some antimicrobial properties and thus the growth of harmful plant diseases and bacteria can be prevented or decreased using cultivation medium based on peat; peat is also widely used as desiccant for animals.

The use of non-decomposed *Sphagnum* moss as growing medium is well known in the field. *Sphagnum* moss is commonly used for the culture of orchids. It has been suggested as plant growth medium in combination with perlite, vermicompost, compost, composted pine bark and fertilizers. Germination mats comprising a substrate including a layer comprising sphagnum moss particles and plurality of seeds situated on or incorporated in said substrate are suggested in WO 9856232. Absorbent structures containing *Sphagnum* moss are presented in U.S. Pat. No. 5,635,029.

Water level regulation, fertilizer regulation, particularly at greenhouses and the like, operating on a larger industrial or commercial scale with the presently available *Sphagnum* moss products are difficult to control and operate. Further, growth mediums comprising *Sphagnum* moss tend to lose their structure when roots of plants penetrate the moistened mats.

Traditional wet laid methods have been suggested for the manufacture of mats etc. comprising *Sphagnum* moss, but the structure of these product is not retained after irrigation.

Based on the above it can be seen that there is a need for new growing medium structures comprising *Sphagnum* moss, suitable for example as cultivation and growing media, said growing medium structures having advantageous cultivation properties, retaining their structure and simultaneously being cost-effective, recyclable and environmentally sustainable products.

Technique relating to producing foam-laid fiber webs is known in the field of manufacture of paper and tissue products. A fiber web is formed from a dispersion of fibers in a foamed liquid. Pulp or fiber furnish is first prepared in a breaker, followed by dewatering and mixing with a foamable liquid containing a surfactant and water whereby the fibers are dispersed in the foam. The formed dispersion is deposited on to a foraminous support, which allows the liquid, which is essentially in the form of foam, to drain through while retaining most of the fibers in the form of a web. This technique is disclosed for example in EP 481746.

Based on the above it can be seen that there also exists a need to provide new methods for the manufacture of growing medium structures based on Sphagnum moss.

SUMMARY

The present invention relates to growing medium structures comprising Sphagnum moss, and to foam-laid methods for producing highly porous and solid growing medium structures based on *Sphagnum* moss. With said method growing medium structures comprising *Sphagnum* moss may be obtained for various applications in the field of horticulture, for example growing boards (cultivation sheets/boards), sowing and cutting cubes (seedling cultivation cubes), and planting blocks (growth blocks).

The invention provides simple, continuous, flexible, economic and effective means for producing said growing medium structures.

The invention is directed to a method for the manufacture of growing medium structures comprising *Sphagnum* moss, said method comprising the steps of:
  forming at least one foamed dispersion by dispersing moss particles comprising *Sphagnum* moss in a mixture comprising water and at least one foaming agent,
  conveying the foamed dispersion or dispersions to a foraminous support and draining liquid trough the foraminous support to form a sheet, and
  drying the sheet.

The invention is further directed to a growing medium structure comprising *Sphagnum* moss, suitably comprising 45-99.9% by weight of *Sphagnum* moss. Said growing medium structure comprising *Sphagnum* moss is obtainable by the above method.

The invention is also directed to the use the growing medium structures comprising *Sphagnum* moss in horticulture applications, such as growing boards (cultivation sheets/boards), sowing and cutting cubes (seedling cultivation cubes), planting blocks, decorative products, and in agriculture, forestry and landscaping applications.

An object of the invention is to provide growing medium structures comprising *Sphagnum* moss, for use in horticulture, agriculture, forestry and landscaping applications.

Another object of the invention is to provide a method for the manufacture of growing medium structures comprising *Sphagnum* moss.

A further object of the invention is the use and method of use of said growing medium structures comprising *Sphagnum* moss in horticulture, agriculture, forestry and landscaping applications.

The characteristic features of the invention are presented in the appended claims.

BRIEF DESCRIPTION OF THE DRAWINGS

FIG. 1 presents a photograph of the growing medium structure comprising *Sphagnum* moss, according to the invention.

DEFINITIONS

Unless otherwise specified, the terms, which are used in the specification and claims, have the meanings commonly used in the field of forestry, horticulture and agriculture. Specifically, the following terms have the meanings indicated below.

The term "growing medium" is understood here to mean a medium suitable for cultivation and/or growing of seedlings, cuttings and plants.

The term "growing medium structure" or growing structure is understood to mean here growing boards (cultivation sheets/boards), sowing and cutting cubes (seedling cultivation cubes), and planting blocks (growth blocks), particularly used in the field of horticulture.

"Foam-laying", also known as "foam-forming" refers here to any conventional mono-layer and multi-layer foam-laid method used in the manufacture of non-woven fibrous materials, tissue products and the like.

The term "foraminous support", also known as "foraminated support" refers here to a wire or the like.

DETAILED DESCRIPTION OF THE INVENTION

The present invention is based on studies relating to *Sphagnum* moss (denotes here also *Sphagnum* biomass). *Sphagnum* moss refers here to *Sphagnum* mosses, which are the primary peat-forming plants in peat lands and bogs. *Sphagnum* moss is a living and non-decomposed renewable biomaterial. *Sphagnum* moss is renewed approximately every 30 years. *Sphagnum* bog grows from 2000 to 5000 kg of moss (calculated as dry matter)/10 000 $m^2$/year. When from 15 to 20 cm of the top most living moss layer of the bog is removed, the treated area typically retains its original state and appearance already within 1-3 years. No release of harmful substances to water systems takes place, and emissions to the climate are about the same as that from a bog in natural state. No ditching or other treatment of bogs is necessary. The harvesting of the *Sphagnum* moss can be carried out at any time of the year, however suitably the harvesting is carried out at winter time when there is at least 20 cm of ground frost. *Sphagnum* moss lumps may be excavated and placed for example into cages or on pallets, where they are drained and dried. The harvested moss may suitably be arranged in ricks or stacks for drying or draining.

*Sphagnum* moss may be harvested from natural bogs, former (dug or cut-away) peat bogs and peat lands and their fringe areas, moss lands and bogs where forestry is not economically viable, ditched peat lands and low moss lands having no value with respect to environmental protection, or alternatively from areas where *Sphagnum* farming is carried out, including cut-over bogs, former bog grasslands, open water areas in abandoned lignite strip mines and the like, and any lands suitable for *Sphagnum* farming.

Same production areas can be used with a 20-30 year growing cycle without losing the bog or moss land. Typically already after two years from harvesting the area has restored normal *Sphagnum* moss growth. Thus *Sphagnum* moss is genuinely renewable material, having from 2 to 3 times faster renewal rate when compared to forests, and it has a significant economic value when compared to forest cultivation. Use of *Sphagnum* moss also reduces the utilization of peat and thus provides protection to peat bogs having significantly slower renewal rate.

*Sphagnum* moss is understood to mean here living biomass, which is substantially non-decomposed. *Sphagnum* moss of the genus *Sphagnum* may comprise one or more botanical *Sphagnum* species. Examples of sections of *Sphagnum* species are *Palustria*, *Rigida*, *Squarrosa*, *Subsecunda*, *Isocladus*, *Cuspidata*, *Polyclada* and *Acutifolia*. Examples of *Sphagnum* species are *Sphagnum magellanicum*, *Sphagnum palustre*, *Sphagnum papillosum*, *Sphagnum fimbriatum*, *Sphagnum rubellum*, *Sphagnum cristatum*, *Sphagnum australe* (*antarcticum*), *Sphagnum falcatulum*, *Sphagnum subtinens*, *Sphagnum squarrosum* and *Sphagnum subsecundum*. The most common species are *S. fuscum*, *S. magellanicum* and *S. riparium*. Preferably a mixture of *Sphagnum* species or naturally occuring *Sphagnum* moss blend is used.

*Sphagnum* moss is like a big sponge and it retains water and releases hydrogen ions, thus maintaining high acidity. Particularly the acidity of *Sphagnum* moss has a clear effect on inhibiting microbe growth, for example bacteria growth, resulting in that bacteria can't thrive and breakdown plant matter.

Suitably, in the present invention the *Sphagnum* moss has von Post value of H-2. The "Modified Von Post Method" of characterizing the degree of decomposition of a stratum of peat moss is the art accepted field test and it is described in detail in "Peat Bogs of the Inhabited Part of Roberval. Lac St. Jean, Dubuc and Chicoutini Counties": A publication of the Ministere Des Richesses Naturelles Du Quebec. Director Générale Des Mines: authored by Antoine Simard. Quebec 1974.

The freshly harvested or pre-dried *Sphagnum* moss (for example in pressed bales) is suitably dried or allowed to dry until a water content of not more than 700 wt % (g water/g dry material) is reached. Drying may be carried out naturally or using any suitable drying methods. *Sphagnum* moss typically comprises living plants, twigs, roots, branches and the like. The (optionally dried) *Sphagnum* moss may be subjected to reduction of particle size, using suitable methods, such as methods selected from crushing, chopping, grinding, milling or cutting known as such, in wet state or in dry state.

The reduction of particle size is suitably followed by one or more methods selected from sieving, sorting, screening and classifying, in wet or dry state, to provide homogeneous *Sphagnum* moss fractions having desired particle size classes. Said moss fractions comprise moss particles, for example class (A) having maximum particle size of 40 mm, class (B) having maximum particle size of 20 mm, and class (C) having maximum particle size of 10 mm. Suitable particle size fraction may be selected according to the product, for example *Sphagnum* moss fractions having particles of bigger particle size may be used in cultivation boards and the like, smaller particle size fractions in sowing cubes and the like.

It was surprisingly found that highly porous, flexible, solid and durable growing medium structures comprising *Sphagnum* moss can be obtained utilizing a foam-laid method, in an effective, continuous and economic way. The growing medium structures may be designed and manufactured according to varying needs and specifications, with respect to the composition, dimensions, thickness and porosity of the desired product.

The method for the manufacture of growing medium structures comprising Sphagnum moss comprises the steps of:
forming at least one (first) foamed dispersion by dispersing moss particles comprising *Sphagnum* moss in a mixture comprising water and at least one foaming agent,
conveying the foamed dispersion or dispersions to a foraminous support and draining liquid through the foraminous support to form a web, and
drying the web.

Said mixture may be foamable liquid or pre-fabricated foam, formed of water and at least one foaming agent.

Optionally at least one additional foamed dispersion is formed of *Sphagnum* moss particles, where said *Sphagnum* moss particles may have same or different maximum particle size as the above mentioned *Sphagnum* moss, by dispersing said materials in a mixture comprising water and at least one foaming agent. Additionally fibrous material selected from natural fibers, synthetic fibers, and any combinations thereof may be dispersed in said mixture.

Optionally said foamed dispersions are conveyed to the foraminous support as individual layers.

The foraminous support is suitable a wire.

The draining is suitably carried out with the aid of vacuum, using vacuum pumps, or by gravitational filtration.

Drying of the formed web (plate or sheet) is suitably carried out for example by heating said web. Particularly suitably a drying temperature of 15-40° C. is used.

The heating may be carried out using any suitable heating method, such as blowing hot air, IR-heaters etc.

In the method the foamed dispersion (or dispersions) is formed of 0.1-10 wt %, preferably 0.5-8 wt %, particularly preferably 1-5 wt % of moss particles comprising *Sphagnum* moss, of 0.005-5 wt %, preferably 0.01-2 wt %, particularly preferably 0.01-1 wt % of at least one foaming agent, water and optional binders, optional additional fibrous materials and optional additives.

Optionally the pH of the foamed dispersion is adjusted to 4-7, preferably to 5.5.-6.4 by using a base or an acid, suitably sodium hydroxide or dolomite lime, or sulfuric acid, hydrochloric acid or nitric acid.

The amount of optional additional fibrous material may range from 0.1 to 50 wt %, preferably 0.5-8 wt %, particularly preferably 1-5 wt %, calculated from of the total dry mass.

Said optional additional foamed dispersion (or dispersions) is formed of 0.1-10 wt %, preferably 0.5-8 wt %, particularly preferably 1-5 wt % of moss particles comprising *Sphagnum* moss where said *Sphagnum* moss may have same or different maximum particle size as the *Sphagnum* moss used in the first dispersion, or of at least one fibrous material selected from natural fibers, synthetic fibers, and any combinations thereof, or combinations of *Sphagnum* moss with said fibrous material may be used, in combination with 0.005-5 wt %, preferably 0.01-2 wt %, particularly preferably 0.01-1 wt % of at least one foaming agent, water and optional binders and optional additives. The additional foamed dispersion (s) is conveyed individually on the support, whereby a product comprising at least two layers is obtained.

The foamed dispersion(s) comprises from 35 to 75% by volume, preferably from 50 to 60% by volume of air. Air refers here to all gases having more than 50% by volume of nitrogen content, which includes atmospheric air and gases derived from atmospheric air.

The foaming agent may act as a surface active agent (surfactant), that enables the formation of the foam and additionally it may act as a binder in the formed growing medium structure.

The foaming agent may be of any suitable type, such as anionic, cationic, non-ionic and amphoteric surfactants. Additionally, wet-strengtheners, binders, starch-based binders, polyvinyl alcohol, latex creping chemicals etc. may be used.

The foaming agent is selected from anionic, cationic, non-ionic and amphoteric surface active agents and surfactants and any combination thereof, such as proteins, polyvinyl alcohols and foamable starches and starch derivatives. Suitably said foaming agent is selected from anionic and non-ionic surface active agents, polyvinyl alcohols and foamable starches and starch derivatives. Examples of suitable anionic surfactants are sodium dodecyl sulphate, potassium dodecyl sulphate, ammonium lauryl sulphate, sodium stearate, sodium dodecyl benzene suphonate and sodium dioctylsuccinate. Examples of suitable non-ionic surfactants are glyceryl laurate, sorbitan monostearate, sorbitan tristrearate, cocamide monoethanolamine, stearyl alcohol, decyl glucoside and hydroxypropyl methyl cellulose.

Polyvinyl alcohols and foamable starch derivatives act simultaneously as surfactants and binders.

Optionally at least one additional binder is used in an amount of 0.005-10% by weight, preferably 0.05-2% by weight, particularly preferably 1-0.5% by weight. Suitably the binder is selected from polyvinyl alcohols, binders based on finely refined cellulose or cellulose derivatives, biopolymers such as starches, starch derivatives, natural gum latexes, alginates, guar gum, hemicellulose derivatives, nanocellulose, chitin, chitosan, pectin, agar, xanthan, amylose, amylopectin, gellan gum, dextran, pullulan, fructan, locust bean gum, carrageenan, glycogen, glycosaminoglycans, murein, polyaspartic acid, bacterial capsular polysaccharides, and the like, and combinations thereof.

The optional fibrous material may comprise natural fibers, synthetic fibers and any combinations thereof. Natural fibers may be selected from viscose fibers, fibers originating from non-wood plant raw material, such as seed hair fibers, leaf fibers, bast fibers, plant fibers provided from straws of grain crops, wheat straw, reed canary grass, reeds, flax, hemp, kenaf, jute, ramie, seed, sisal, abaca, coir, bamboo, bagasse, cotton kapok, milkweed, pineapple, cotton, rice, reed, esparto grass, *Phalaris arundinacea*, white peat having von Post value of H-2 or H-3, dark peat having von Post value of H-4 to H-6, and combinations thereof.

The synthetic fibers may comprise fibers of polyester, polyethylene, polypropylene, polylactide, rayon, lyocell, nylon, glass, polyacetate, aramide, carbon and combinations thereof.

Additionally, optional additives may be used. Said additives may comprise wetting agents, wet-strengtheners, latex creping agents, coloring agents, nutrients, minerals, fertilizers, seeds, softening agents, inorganic fillers, biocarbon (obtained by pyrolysis of plant derived material), buffers, calcium carbonate, magnesium carbonate, clay, microbes, and combinations thereof.

In the foam-laid method any equipment and apparatus used in foam-laying processes in the tissue paper and non-woven manufacture can be utilized here, such as suggested for example in GB 1397378, EP 481746 and U.S. Pat. No. 3,716,449. Products comprising one or more foam-deposited layers may be obtained.

Optionally said growing medium structures comprising *Sphagnum* moss can be formed using batch or continuously working molds, muffins, plugs, and for example utilizing mold wires etc. whereby growing medium structures, such as small cubes can be obtained.

Optionally the dried growing medium structure (such as sheet, felt, plate, board, cube etc) may be coated or laminated, suitably on the sides surrounding the growing medium structure with at least one layer comprising at least one polymer, whereby a protective coating or cover is obtained on the sides, and the bottom and the top of the growing medium structure are left without a coating. Optionally the product is cut into pieces of desired form and size after drying. The coating may be carried out before or after the drying.

The applying of the polymer may be carried out by coating using spray coating, dipping, extrusion coating, curtain coating or foam coating or other suitable methods. Suitably biodegradable polymers are used, such as aqueous dispersions of polyvinyl alcohols, starch derivatives, cellulose or cellulose derivatives, suitably of finely refined grades, natural gum latexes, alginates, guar gum, hemicellulose derivatives, chitosan derivatives, polylactides, cellulose acetate, cellulose acetate butyrate, and combinations thereof.

The obtained product i.e. the growing medium structure comprising *Sphagnum* moss may have a thickness of 10-300 mm, preferably from 30 to 250 mm, particularly preferably from 50-150 mm.

The obtained product comprises from 45 to 99.9 wt % of *Sphagnum* moss, preferably from 50 to 99 wt %, particularly preferably from 55 to 98 wt %.

The growing medium structure comprising *Sphagnum* moss comprises moss particles. Said moss particles may comprise A, B or C *Sphagnum* moss fractions or any combinations thereof.

The growing medium structure comprising *Sphagnum* moss comprises from 0.001 to 5 wt % of at least one foaming agent. Preferably said foaming agent acts simultaneously as a binding agent.

The growing medium structure comprising *Sphagnum* moss may comprise from 0.01 to 5 wt % of at least one additional binder.

The growing medium structure comprising *Sphagnum* moss may additionally comprise from 0.1 to 55 wt % of fibers selected from synthetic fibers, natural fibers and combinations thereof.

The growing medium structure comprising *Sphagnum* moss may additionally comprise additives selected from wetting agents, wet-strengtheners, coloring agents, nutrients (Fe, Cu, Mn, Zn, B, Mo), minerals, fertilizers (nitrogen source, $P_2O_5$, $K_2O$), seeds, softening agents, latex creping agents, inorganic fillers, biocarbon (obtained by pyrolysis of plant derived material), buffers, calcium carbonate, magnesium carbonate, clay, microbes, and any combinations thereof.

The growing medium structure comprising *Sphagnum* moss is porous, with other words air containing light weight material with density of 10-250 kg/m$^3$, preferably 20-150 kg/m$^3$, particularly preferably 25-90 kg/m$^3$.

The growing medium structure comprising *Sphagnum* moss has high water retention, suitably of 20-45 vol-%, calculated using the sandbox method for peat substrate testing.

The growing medium structure comprising *Sphagnum* moss has high air retention, suitably of 45-75 vol-% calculated using the sandbox method for peat substrate testing (EN 13041:1999).

The present invention provides highly porous, solid, renewable growing medium structures comprising *Sphagnum* moss, which may optionally be formed or cut to any desired and even complicated forms. Said growing medium structures comprising *Sphagnum* moss may be used in horticulture, agriculture landscaping and forestry applications, such as board, plate, element or sheet for cultivation of plants (growing boards, cultivation sheets/boards), sowing and cutting cubes (seedling cultivation cubic), and planting blocks (growth blocks), soil construction sheet (root support), biodegradable shelter, decoration item, and flower holder. Said growing medium structures comprising *Sphagnum* moss may be used for replacing currently used growing medium structure products based on materials like rock wool and peat, which are typically encased in nets, plastic bags or containers for retaining the structure. The solid and accurately defined growing medium structures comprising *Sphagnum* moss can be easily handled, transported and maintained.

Also multilayered products may be manufactured with predetermined and controlled dimensions.

A very homogeneous growing medium structure comprising *Sphagnum* moss is obtained, which enables optimal air retention and water retention, particularly in view of irrigation.

The growing medium structures comprising *Sphagnum* moss retain their dimensions and form, such as growing boards (cultivation sheets/boards), sowing and cutting cubes (seedling and cutting cultivation cubic), and planting blocks (growth blocks) even when irrigated and also for several growing seasons. Said growing medium structures comprise optimal pore volume for air and water for providing good moisture retention and buffer capacity, and optimal growing circumstances for plants. Even up to 30% better biomass yields, particularly with cucumber, tomato and lettuce seedlings can be obtained with the growing medium structures comprising *Sphagnum* moss when compared to using products comprising rock wool or peat.

Suitably the pH of said growing medium structures is adjusted to the range of 5.5-6.4 during the manufacture.

Plant seeds as well as seedlings, cuttings, and micropropagated plants at various stages may be placed in/on sowing cubes (starter cubes). After germination and/or growing the sowing cubes may be transferred onto planting blocks (growing blocks for transplanting the seedlings) where the seedlings grow and form strong roots in said blocks. Seeds of bigger plants, such as tomatoes and cucumber may be placed directly on a growing block. The planting blocks may be transferred on growing boards (cultivation sheets/boards), where the plant roots grow and penetrate in the growing board, the plants grow and yield the harvest. After the growing season the growing medium structures may be reused, recycled and composted.

Said growing medium structures comprising *Sphagnum* moss may suitably be used for replacing rock wool and peat products in the cultivation of ornamental plants, vegetables (for example cucumber, tomatoes, lettuce), and generally in greenhouse cultivation and in horticulture applications. Said growing medium structures have superior performance in first farming of seedlings, in starter cubes in the cultivation of seedlings and plants, and they also suit well for green building applications, as green walls, roofs etc.

Said growing medium structures provide a durable high performance growing medium for plant production, improved plant production economy, nutrient efficiency and water efficiency because of good moisture, air and nutrient retention. Said solid growing medium structures enable the use of automated handling (robotics) in the plant production, the maintenance costs are reduced, biomass production is increased, and growing media disposal costs are reduced because of the reuse or composting of the growing medium structures. Less frequent maintenance of irrigation water recycle filter is required due to clean runoff since humus is not released from the growing medium structures in significant amounts.

Further, said growing medium structures are safe and easy to handle, and they have low dusting properties. Said growing medium structures have antimicrobial properties, particularly antibacterial, antifungal and mold-controlling properties (against for example *Plicaria* sp.), which is a clear advantage. This also results in that many plant diseases can be avoided.

Said growing medium structures may be used for replacing growing media based on rock wool or peat, for starting and growing plants. Sustainable harvest is obtained when compared to peat. Peat requires about 3000 years for renewal, *Sphagnum* moss about 30 years. Harvesting of *Sphagnum* moss is comparable with forestry, not peat production. The function of carbon sink is restored already within three years after light *Sphagnum* moss removal, no expensive ditching, field preparation or road construction is required.

The growing medium structures comprising *Sphagnum* moss may be cut or formed to a board, plate, element or sheet or other form suitable for horticulture etc use. Said product may be designed from stiff to flexible. The manufacturing process may be adjusted accordingly.

The invention provides a continuous, effective and economic method for the manufacture of highly porous growing medium structures comprising *Sphagnum* moss, where smaller amounts of water are required in the processing, thus providing economic and environmental benefits. Completely bio-degradable products can be achieved if desired. The properties of the products can be tailored by adjusting the starting materials and process.

In horticulture use the growing medium structures may additionally comprise nutrients and fertilizers etc., according to the requirements of plants which are grown on the growing medium structure, as well as seeds if desired.

Tailored growing medium structures/products can be manufactured according to end user's need, the amounts of components, surfactants and binders may be varied resulting in different properties in the products. For example when polyvinyl alcohol is used, a soft and more flexible structure is obtained. Also highly porous products may be obtained.

The growing medium structures are mold-resistant, durable, and non-swellable when moistened and they retain their form and structure even up to three years after use as growing medium.

EXAMPLES

The following examples are illustrative of embodiments of the present invention, as described above, and they are not meant to limit the invention in any way.

Example 1

Foam-laid Manufacture of 10 cm Thick Growing Medium Structure Comprising *Sphagnum* Moss, using a Laboratory Scale Hand Sheet Mold Foam-laid *Sphagnum* moss growing medium structures were prepared using a laboratory scale foam hand sheet mold. 150 g in dry weight of *Sphagnum* moss particles class (A) having maximum particle size of 40 mm were mixed with a prefabricated foam, which was produced by stirring water and polyvinyl alcohol (foaming agent) at 3500 rpm, where the amount of the foaming agent in the mixture was 0.2% and the amount the moss particles was 5%. The fiber foam was decanted into the hand sheet mold and filtrated through a wire using a vacuum chamber. The mentioned procedure was repeated five times in order to get the target thickness. The *Sphagnum* moss growing media structures (foam-laid growth blocks) formed were dried at room temperature. The growing medium structure comprising *Sphagnum* moss was porous, density of 75 kg/m$^3$. A photo of said growing medium structure is presented in FIG. 1.

Example 2

Foam-laid Manufacture of 10 cm Thick Growing Medium Structure Comprising 50 wt % of *Sphagnum* Moss and 50 wt % of Peat Using a Laboratory Scale Hand Sheet Mold Foam-laid *Sphagnum* moss growing medium structures were prepared using a laboratory scale foam hand sheet mold. 75 g in dry weight of *Sphagnum* moss particles class (A) having maximum particle size of 40 mm and 75 g in dry weight of peat were mixed with a prefabricated foam, which was produced by stirring water and foaming agent polyvinyl alcohol (foaming agent) at 3500 rpm, where the amount of the foaming agent in the mixture was 0.2% and the amount the moss particles was 5%. The fiber foam was decanted into the hand sheet mold and filtrated through a wire using a vacuum chamber. The mentioned procedure was repeated six times in order to get the target thickness. The *Sphagnum* moss/peat growing medium structures (foam-laid growth blocks) formed were dried at room temperature. The growing medium structure comprising *Sphagnum* moss and peat had density of 90 kg/m$^3$.

Example 3

Comparative

Wet-laid Manufacture of Growing Medium Structure Comprising 100 wt % *Sphagnum* Moss Wet-laid *Sphagnum* moss growing medium structures were prepared with laboratory sheet former according to standard SCAN-C 26:76. Departing from the standard, wet-laid samples were not wet pressed. In the preparation of each sample 60 grams of disintegrated (SCAN-C 18:65) *Sphagnum* moss was utilized. The samples were dried. Basis weight and density of wet-laid dry structures were 2240 g/m² and 40 kg/m³.

Example 4

Growing Medium Studies with Foam-laid Structures and Wet-laid Structures Described in the Examples 1-3.

In the growing media studies plants were found to grow faster in the foam-laid growing medium structures of examples 1 and 2 than in the wet-laid samples of example 3. In the wet-laid samples the layered distribution of *Sphagnum* moss fractions and thus uneven pore size distribution were likely to result in the slower grow rate in this growing medium. Uneven pore size distribution influences variation on the water absorption property of the growing medium, causing water rich and water poor areas in the medium. Respectively, the even pore size distribution of foam-laid *Sphagnum* growing medium structure was found to enable good water and nutrient transportation in the whole medium.

Example 5

Growing Media Studies with Foam-laid Growth Blocks Described in the Examples 1 and 2 and Rock Wool Growth Blocks Cucumber seedlings were planted and grown in a greenhouse, in growth blocks of examples 1 and 2, manufactured by the foam-laying method. Said blocks contained (A) 100% *Sphagnum* moss, (B) 50 wt % of *Sphagnum* moss and 50 wt % of peat. Rock wool growth block was used as comparative block (C). Results are presented in following table 1.

TABLE 1

| Growing block | A | B | C |
|---|---|---|---|
| Composition/wt % | Sphagnum moss 100 | Sphagnum moss 50 + peat 50 | Rock wool 100 |
| Shoot length/cm | 43 | 44 | 41 |
| Number of leaves longer than 5 cm | 6.0 | 6.3 | 6.1 |
| Fresh weight/g | 108 | 115 | 110 |

The invention claimed is:

1. A method for the manufacture of a growing medium structure comprising Sphagnum moss that is a living biomaterial, wherein the method is a foam-laid method, which comprises the steps of:
preparing at least one foamed dispersion by dispersing moss particles comprising *Sphagnum* moss that is a living biomaterial in a mixture comprising water and at least one foaming agent, wherein the foamed dispersion or dispersions comprises 0.5-10 wt % of said *Sphagnum* moss particles,
decanting said foamed dispersion into a sheet mold to form a foamed dispersion or dispersions, conveying the foamed dispersion or dispersions to a wire foraminous support, and draining liquid through the foraminous support to form a web, and
drying the web at 15-40° C. to form said growing medium structure comprising *Sphagnum* moss, that is a living biomaterial, and
wherein after drying the growing medium structure comprises:
45-99.9 wt % of moss particles comprising Sphagnum moss; and
001-5% by weight of at least one foaming agent, wherein the growing medium structure has an ability to retain water in amount of 20-45 vol-% and density of 10-250 kg/m³ and a thickness of 10-300 mm.

2. The method according to claim 1, wherein at least one additional foamed dispersion is formed by dispersing moss particles comprising said Sphagnum moss in a mixture comprising water and at least one foaming agent.

3. The method according to claim 1, wherein the foamed dispersion or dispersions comprises 0.0005-5 wt % of at least one foaming agent.

4. The method according to claim 3, wherein the foamed dispersion or dispersions comprises 0.01-2 wt % of at least one foaming agent.

5. The method according to claim 1, wherein the foamed dispersion or dispersions comprise additionally fibers selected from natural fibers, synthetic fibers and combinations thereof.

6. The method according to claim 1, wherein the foaming agent is selected from anionic, cationic, non-ionic and amphoteric surface active agents and combinations thereof.

7. The method according to claim 6, wherein the foaming agent is selected from polyvinyl alcohols, starches, starch derivatives and combinations thereof.

8. The method according to claim 1, wherein the foamed dispersion or dispersions comprises additionally one or more binders, coloring agents, nutrients, fertilizers, seeds, wetting agents, wet strengtheners, latex creping chemicals, softening agents, inorganic fillers, biocarbon, buffers, calcium carbonate, magnesium carbonate, clay, microbes, and any combinations thereof.

9. The method according to claim 1, wherein the foamed dispersions are conveyed to the foraminous support as individual layers.

10. The method according to claim 1, wherein the growing medium structure comprises sides, top and bottom, and after drying the growing medium structure is coated on the sides with a polymer.

11. The method according to claim 1, wherein the Sphagnum moss is selected from mixtures of Sphagnum species and naturally occuring Sphagnum moss blends.

12. The method according to claim 1, wherein the foamed dispersion or dispersions comprises 0.5-8 wt % of said Sphagnum moss particles.

* * * * *

UNITED STATES PATENT AND TRADEMARK OFFICE
CERTIFICATE OF CORRECTION

PATENT NO. : 10,701,873 B2
APPLICATION NO. : 15/025120
DATED : July 7, 2020
INVENTOR(S) : Ari Erkkilä et al.

It is certified that error appears in the above-identified patent and that said Letters Patent is hereby corrected as shown below:

In the Claims

In Claim 1, at Column 11, Line 54:
Change "0.5-10 wt %" to -- 0.1-10 wt% --

In Claim 1, at Column 12, Lines 5-6:
Delete "that is a living biomaterial,"

In Claim 1, at Column 12, Line 11:
Change "001-5%" to -- 0.001 to 5% --

In Claim 3, at Column 12, Line 21:
Change "0.0005-5 wt %" to -- 0.005-5 wt % --

Signed and Sealed this
Twenty-seventh Day of October, 2020

Andrei Iancu
*Director of the United States Patent and Trademark Office*